United States Patent
Hagg et al.

(10) Patent No.: US 10,909,202 B2
(45) Date of Patent: Feb. 2, 2021

(54) INFORMATION PROVIDING TEXT READER

(71) Applicant: SONY CORPORATION, Tokyo (JP)

(72) Inventors: Wilhelm Hagg, Korb (DE); Thomas Kemp, Esslingen (DE)

(73) Assignee: SONY CORPORATION, Tokyo (JP)

(*) Notice: Subject to any disclaimer, the term of this patent is extended or adjusted under 35 U.S.C. 154(b) by 288 days.

(21) Appl. No.: 14/412,522

(22) PCT Filed: Jun. 6, 2013

(86) PCT No.: PCT/EP2013/001669
§ 371 (c)(1),
(2) Date: Jan. 2, 2015

(87) PCT Pub. No.: WO2014/008965
PCT Pub. Date: Jan. 16, 2014

(65) Prior Publication Data
US 2015/0154308 A1    Jun. 4, 2015

(30) Foreign Application Priority Data
Jul. 13, 2012  (EP) ..................... 12005169

(51) Int. Cl.
*G06F 16/954*    (2019.01)
*G06F 16/338*    (2019.01)
(Continued)

(52) U.S. Cl.
CPC .......... *G06F 16/954* (2019.01); *G06F 16/338* (2019.01); *G06F 16/34* (2019.01); *G06F 16/35* (2019.01); *G06F 40/30* (2020.01)

(58) Field of Classification Search
CPC ......... G06F 17/30873; G06F 17/30696; G06F 17/30705; G06F 17/30716; G06F 17/2785
See application file for complete search history.

(56) References Cited

U.S. PATENT DOCUMENTS 7,089,504 B1    8/2006  Froloff
7,702,611 B2    4/2010  Chi et al.
(Continued)

FOREIGN PATENT DOCUMENTS

CN    1723458 A    1/2006
CN    101061478 A    10/2007
(Continued)

OTHER PUBLICATIONS

Chi, E.H., et al., "ScentHighlights: Highlighting Conceptually-Related Sentences during Reading", IUI, Total 3 Pages (Jan. 10-13, 2005).
(Continued)

*Primary Examiner* — Ashish Thomas
*Assistant Examiner* — Dustin D Eyers
(74) *Attorney, Agent, or Firm* — Xsensus LLP

(57) ABSTRACT

A method for providing digital information based on a text document includes generating, for at least a first passage of the text document, first topic data indicative of a topic of the first passage using a first natural language analysis, performing a first search for the digital information using the first topic data, the first search providing a first search result, linking the first search result to the first passage, and displaying the first search result upon a request.

20 Claims, 16 Drawing Sheets

(51) Int. Cl.
*G06F 16/34* (2019.01)
*G06F 16/35* (2019.01)
*G06F 40/30* (2020.01)

(56) References Cited

U.S. PATENT DOCUMENTS

| | | | |
|---|---|---|---|
| 8,762,368 B1* | 6/2014 | Duddu | G06F 16/353 |
| | | | 707/722 |
| 2005/0120311 A1* | 6/2005 | Thrall | G06F 16/9535 |
| | | | 715/811 |
| 2006/0059143 A1* | 3/2006 | Palmon | G06F 17/30286 |
| 2006/0080295 A1* | 4/2006 | Elsaesser | G06F 16/3331 |
| 2007/0094247 A1* | 4/2007 | Chowdhury | G06F 16/90335 |
| 2007/0265996 A1* | 11/2007 | Odom | G06F 17/30616 |
| 2008/0154859 A1* | 6/2008 | Chi | G06F 17/30867 |
| 2008/0301117 A1* | 12/2008 | Zeng | G06F 17/30864 |
| 2009/0079547 A1* | 3/2009 | Oksanen | G06Q 30/02 |
| | | | 340/10.3 |
| 2009/0119717 A1 | 5/2009 | Newton et al. | |
| 2009/0125382 A1* | 5/2009 | Delepet | G06N 5/02 |
| | | | 705/347 |
| 2009/0150431 A1* | 6/2009 | Schmidt | G06F 17/30595 |
| 2009/0164929 A1* | 6/2009 | Chen | G06F 17/30867 |
| | | | 715/769 |
| 2009/0292674 A1* | 11/2009 | Dasdan | G06F 17/3064 |
| 2010/0082570 A1* | 4/2010 | Altaf | G06F 17/30637 |
| | | | 707/706 |
| 2011/0087955 A1 | 4/2011 | Ho et al. | |
| 2011/0131207 A1* | 6/2011 | Jonsson | G06Q 10/107 |
| | | | 707/730 |
| 2011/0145250 A1 | 6/2011 | Spaggiari | |
| 2011/0145724 A1 | 6/2011 | Tsai et al. | |
| 2011/0225159 A1* | 9/2011 | Murray | G06F 17/30713 |
| | | | 707/739 |
| 2011/0261030 A1 | 10/2011 | Bullock | |
| 2011/0298441 A1* | 12/2011 | Waltisperger | H02M 3/1588 |
| | | | 323/299 |
| 2013/0036381 A1* | 2/2013 | Joshi | G06F 17/30867 |
| | | | 715/808 |
| 2013/0159346 A1* | 6/2013 | Kasravi | G06F 17/30684 |
| | | | 707/771 |

FOREIGN PATENT DOCUMENTS

| | | |
|---|---|---|
| CN | 101073077 A | 11/2007 |
| CN | 101641697 A | 2/2010 |
| CN | 102053977 A | 5/2011 |
| CN | 102541849 A | 7/2012 |
| WO | 2004 053732 | 6/2004 |
| WO | 2011 077244 | 6/2011 |

OTHER PUBLICATIONS

Written Opinion of the International Searching Authority dated Aug. 19, 2013 in PCT/EP13/001669 Filed Jun. 6, 2013.
International Search Report dated Aug. 19, 2013 in PCT/EP13/001669 Filed Jun. 6, 2013.
Combined Chinese Office Action and Search Report dated Mar. 9, 2017 in Patent Application No. 201380037264.8 (with English Translation of Category of Cited Documents).
Combined Office Action and Search Report dated Sep. 12, 2017 in Chinese Patent Application No. 201380037264.8 (with English-language Translation).

* cited by examiner

Family recipes – Apple Cake

*Apple cake is known since several hundred years and popular as a dessert after dinner or with the afternoon tea. Main ingredients are apples which add fragrance to a plain cake base. Traditional apple cakes further by include various spices such as cinnamon or clove. Further, crushed nuts such as walnuts or almonds are occasionally added.*

3 eggs
1 cup vegetable oil or butter
2 cups white sugar
2 teaspoons ground cinnamon
1/4 teaspoon salt
3 cups all-purpose flour
1 teaspoon baking soda
4 cups apples (peeled, cored and diced)

Preheat oven to 180° C.

Grease and flour a cake pan.

In a mixing bowl; beat oil and eggs with an electric mixer until creamy. Add the sugar and vanilla and beat well.

Combine the flour salt, baking soda, and ground cinnamon together in a bowl.

Slowly add this mixture to the egg mixture and mix until combined. The batter will be very thick. Fold in the apples by hand using a wooden spoon.

Spread batter into the prepared pan.

Bake at 180° C for 45 minutes or until cake tests done.

Let cake cool down and serve with a dusting of confectioners' sugar.

Nutritional Information
Amount Per Serving  Calories: 201 | Total Fat: 9.7g | Cholesterol: 18mg History of apple cakes
... german apple cake ... austrian Apfelstrudel...

link: http//...

Apfelstrudel

A strudel is a type of sweet layered pastry with a filling inside. It gained popularity in the 18th century through the Habsburg Empire.

link: http//...

Fig. 3b

Family recipes – Apple Cake

Apple cake is known since several hundred years and popular as a dessert after dinner or with the afternoon tea. Main ingredients are apples which add fragrance to a plain cake base. Traditional apple cakes further by include various spices such as cinnamon or clove. Further, crushed nuts such as walnuts or almonds are occasionally added.

3 eggs
1 cup vegetable oil or butter
2 cups white sugar
2 teaspoons ground cinnamon
1/4 teaspoon salt
3 cups all-purpose flour
1 teaspoon baking soda
4 cups apples (peeled, cored and diced)

Preheat oven to 180° C.

Grease and flour a cake pan.

In a mixing bowl; beat oil and eggs with an electric mixer until creamy. Add the sugar and vanilla and beat well.

Combine the flour salt, baking soda, and ground cinnamon together in a bowl.

Slowly add this mixture to the egg mixture and mix until combined. The batter will be very thick. Fold in the apples by hand using a wooden spoon.

Spread batter into the prepared pan.

Bake at 180° C for 45 minutes or until cake tests done.

Let cake cool down and serve with a dusting of confectioners' sugar.

Nutritional Information
Amount Per Serving  Calories: 201 | Total Fat: 9.7g | Cholesterol: 18mg

— 200

— 300

— 800

Weight 0,2 *
(recipes, dessert)
Weight 0,5 *
(traditional apple cake)
Weight 1.0 *
(cinnamon)

Fig. 8

INFORMATION PROVIDING TEXT READER

CROSS REFERENCE TO RELATED APPLICATION

The present application claims the benefit of the earlier filing date of EP 12 005,169.3 filed in the European Patent Office on 13 Jul. 2012, the entire content of which application is incorporated herein by reference.

BACKGROUND

Field of the Disclosure

The present disclosure relates to a method for providing digital information based on a text document. Further, the disclosure relates to a data processing apparatus, a computer program and to a non-transitory computer-readable medium adapted to perform the method.

Description of Related Art

It is known to use electronic data processing devices in conjunction with a display for displaying text to a user. For example, it is becoming increasingly popular for users to read texts, e.g. books and magazines, on devices called "e-book readers" rather than as printed media. Similarly, it has become popular for users to download texts from the internet using a desktop, laptop or tablet computer and to read the texts on a display device that is in communication with or built into the computer. If interested in obtaining further information related to the text, the users may use for example a search engine to enter queries for more information.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

It is an object to provide a method of enhancing a user's reading experience.

This object is solved by a method, a data processing apparatus, a computer program and a non-transitory computer-readable medium according to the independent claims.

A method for providing digital information based on a text document comprises generating, for at least a first passage of the text document, first topic data indicative of a topic of the first passage using a first natural language analysis, performing a first search for the digital information using the first topic data, the first search providing a first search result, linking the first search result to the first passage, and displaying the first search result together with the first passage upon a request.

A data processing apparatus comprises a data receiver adapted to receive a text document, a natural language analyzer adapted to perform a first natural language analysis on a first passage of the text document and adapted to generate first topic data indicative of a of a topic of the first passage, a data processor adapted to perform a first search for digital information using the first topic data, the first search providing a first search result, and adapted to link the first search result to the first passage, and a display adapted to display the first search result together with the first passage upon a request.

A computer program includes computer program instructions which when executed by a computer cause the computer to perform a method, the method comprising generating, for at least a first passage of a text document, first topic data indicative of a topic of the first passage using a first natural language analysis, performing a first search for the digital information using the first topic data, the first search providing a first search result, linking the first search result to the first passage, and displaying the first search result together with the first passage upon a request.

Further, a non-transitory computer-readable medium includes the computer program as described.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 illustrates application of the optional method steps of FIG. 7 to the sample text;

DESCRIPTION OF THE EMBODIMENTS

Figure 1:
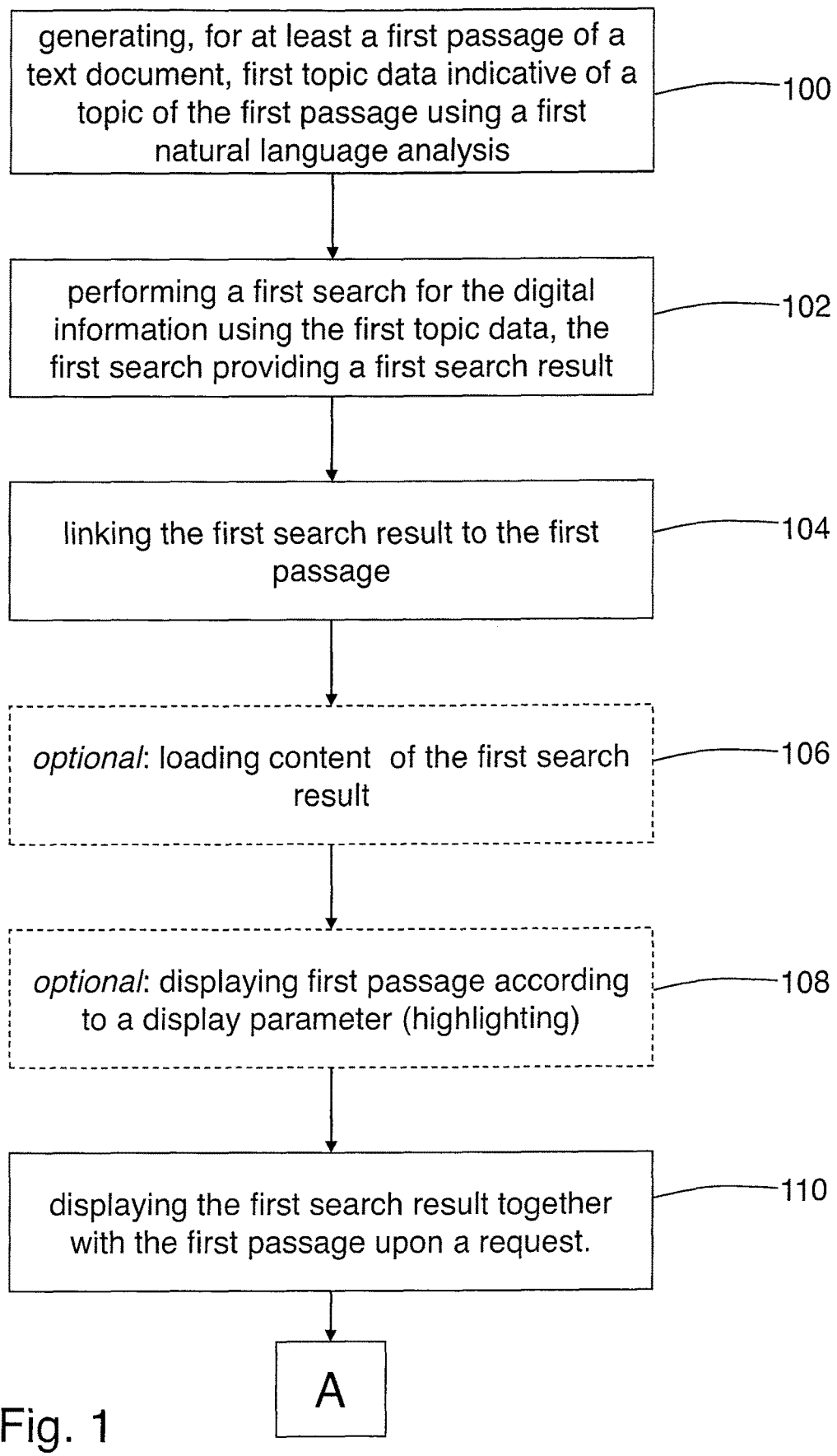
FIG. 1 illustrates a method for providing digital information based on a text document.

Referring now to the drawings, where like reference numerals designate identical or corresponding parts throughout the several views, FIG. 1 illustrates a method for providing digital information based on a text document. At block 100, first topic data is generated for at least a first passage of a text document using a first natural language analysis, the first topic data being indicative of a topic of the first passage.

The text document may be any kind of text, such as a text file, a text document to be read or edited in a text editor, a text document to be displayed in a viewer in a viewing format (e.g. the "portable document format" PDF), a web page, an electronically stored book or magazine (e.g. an "e-book") or any other kind of electronically stored document. For example, the text document may comprise an ASCII representation of one or more portions or an entirety of the text, a Unicode representation of one or more portions or an entirety of the text, an XML representation of one or more portions or an entirety of the text, an HTML representation of one or more portions or an entirety of the text and/or a binary representation of one or more portions or an entirety of the text.

The text document may be stored or located at a device performing the method, at a local server and/or at remote server accessible via a network. The network may be for example a local network, an intranet or the internet, or any other network such as a network for telecommunications or the like.

From the text document, the first passage may be selected. The first passage may be any segment of the text document, such as a segment including several paragraphs, a single paragraph, several or a single sentence, several or a single phrase and/or several or a single word. The segment may for example comprise sub-segments which need not be consecutively located within the text.

Further, also a plurality of passages may be selected at block 100. For example, the text, i.e. the whole text or a whole displayed part of the text, may be automatically divided into a plurality of passages, e.g. into a first to x-th passage. In this case, it may be possible to select a single passage, i.e. the first passage, and/or a subset of the plurality of passages, the subset including a plurality of selected passages.

The first passage (or correspondingly the subset including the plurality of selected passages) may be expressly selected by the reader, e.g. by marking it with a pointing device, by touching a corresponding area of a touch-sensitive display or by a command. Further, the selecting may happen implicitly, e.g. even without notice of the reader, for example when the reader focuses on, stops at or marks the first passage or a corresponding paragraph.

When selected, the first passage may, but need not be highlighted automatically by the method. For example, the first passage may be displayed with another format, e.g. according to a display parameter predetermined for highlighting. The display parameter may be set by a user using the method, or may be determined automatically. When automatically determined, the display parameter may be set in accordance with a semantic content of the first passage, e.g. in accordance with the first topic as determined by the method. For example, the highlighting may include displaying characters or the background in a pre-set color and/or in a bold type, in italics or the like.

Based on the first passage, in particular based on a language of the text of the first passage and/or of its semantic content, the first natural language analysis is carried out for determining the first topic data.

The first natural language analysis may include a semantic analysis and may be based on any kind of technology from the natural language processing field. For example, subject/object relations between words and respective roles of words in sentences may be analyzed. These roles and/or relations may be assigned to the respective words or terms of the first passage during the first natural language analysis, and may be used for determining the first topic.

Further, words of the first passage may be mapped to an existing ontology in order to identify the first topic. For example, words such as "dog" and "cat" may be mapped to "animals", which may be used for determining the first topic. This allows finding other relevant documents, e.g. those about birds.

Further, when analyzing words, a frequency of occurrence of the respective words in the first passage may be analyzed. Words that are contained frequently in the first passage, and not or only rarely in the rest of the document, are likely to characterize a local topic upon which the first topic data may depend. Such words may be referred to as local keywords. They may be given a higher weight than other words when determining the first topic data in a weighted manner based on words of the first passage.

Still further, the first natural language analysis may also include further techniques such as part-of-speech tagging, syntax parsing, semantic parsing, sentiment analysis and summarization.

Thus, the first topic data may be defined and described based on words, terms, ontologies, sub-topics and/or the like. The first topic may include search terms that may be used e.g. in a search query. The first topic data may thus include, describe and/or be related to an issue, matter, subject or theme of the first passage.

At block 102, a first search for digital information is performed using the first topic data. The first search provides a first search result.

For the first search, any kind of search strategy may be used. For example, a search engine for searching digital information may be used. The search engine may be a specialized search engine which is particularly adapted for carrying out the method and/or a text based search. Alternatively, also a general-purpose search engine such as a publicly available search engine accessible via the Internet may be used, e.g. by submitting a search query and retrieving the result via the Internet. The first topic including various search terms may be used as a basis for the search, e.g. as the search query. The first topic data may thus be supplied to a search engine e.g. as a set of or logical expression based on search terms.

During the first search, any kinds of digital storages may be searched and/or accessed. For example, local data storages, locally accessible files and/or remotely located data which is accessible via the network through which the text document has been accessed, or via another (further) network such as an intranet, the internet or a telecommunications network may be accessed and/or retrieved.

Any kind of digital information may be searched, accessed and/or retrieved as the first search result. For example, at least one data file or a multitude of data files may be accessed, e.g. further text documents related to the first topic data. However, not only text documents, but any kind of digitally encoded and thus searchable information may be accessed, such as web pages, media data or the like.

At block 104, the first search result is linked to the first passage. The linking may include any kind of link, e.g. a pointer to metadata describing the first search result, and/or a plurality of links pointing directly to or including addresses of several pieces of information. For example, and uniform resource identifier, uniform resource locator and/or uniform resource name may be included. The linking may thus allow an easy retrieval of the digital information included in the first search result when the first passage is accessed.

At optional block 106, which may, but need not be performed, content according to the first search result may be loaded, e.g. to a device carrying out the method. For loading, the linking of block 104 may be used. The loading allows retrieval of the search result, for example as soon as it is identified and e.g. in the background, without notice of the user. The loading may include storing the loaded content at a local storage of the device carrying out the method, from which local storage the content may be retrieved instantaneously, e.g. upon a user's request. The loading may include loading the linked content as a whole, and/or loading only a representative part of the content, e.g. a shortcut or summary. The respective part, e.g. summary may be determined with respect to the first topic. The representative part may then be displayed together with an icon representing the linked information.

At optional block 108, which may, but need not be performed, the first passage is displayed according to the display parameter (used for highlighting upon selection of the first paragraph) and/or to a further display parameter. The display parameter and/or further display parameter may be determined in dependence on at least one of the first topic data, the first search result and a semantic content of the first search result.

E.g. when the linking has taken place, the first passage may be formatted such that the user notices that additional content is available. The first passage may be formatted, e.g. highlighted as a whole, or only important keywords may be marked. The (further) display parameter may describe a font, a color, a background color, a setting of characters in bold face, italics or an underlining, and may depend on a user's pre-stored settings.

The display parameter and/or the further display parameter may be determined according to a content of the first paragraph, according to the first topic, and/or according to the first search result and/or to the related content. For example, technical facts may be formatted other than opinionated material. The highlighting may be selected so as to intensify the reading, e.g. by utilizing an underlying mood or emotion. By the highlighting, an availability of further content is indicated to the user, whose interest is raised.

At block 110, the first search result is displayed together with the first passage. The displaying may take place upon a request e.g. entered by the user while reading the text document.

The request may be entered via an input device of a reading device used for reading the text document. For example, at a personal computer, the request may be entered by a mouse click to the first passage, to a marking or to an icon representing the linked and/or loaded first search result. Alternatively, the request may be entered by pressing a request key, by touching a corresponding area on a touch-sensitive panel used as a display, or by uttering a corresponding speech command into a microphone.

When displaying the first search result, contents of pieces of information forming the first search result (e.g. a whole text, text passages, summaries or shortcuts of search results) and/or address data indicating where the contents of the pieces of information may be accessed (e.g. links to search results) may be displayed, as will be described in more detail below.

The first search result may be displayed together with the first passage, e.g. in a vicinity or neighboring area of a display where the first passage is displayed. For example, a particular window or column for displaying the first search result may be displayed near the first passage and/or overlapping the first passage. Thus, the digital information found with respect to the first passage is presented to the reader in conjunction with the first passage, providing an easy and direct access to the digital information. The first search result may also be displayed alone, e.g. in an area in which the text document has been displayed before, the area covering for example the whole display or a whole window in which the text document has formerly been displayed. This kind of displaying may be performed for example if the first search result has been (expressly) selected/requested for display.

Alternatively, the displaying may also take place without a request, e.g. once the first search result is retrieved. In this case, the first search result may be displayed in a separate area not overlapping the display of the text document for not disturbing the user while reading.

It should be noted that the determining of the first passage, the generating of the first topic data, the first search and the linking of the first search result or any combination of steps thereof may be performed in the background. For example, the determination of the first passage may happen without notice of the reader, e.g. when the reader stops at the first passage or at a corresponding paragraph, takes a long time for reading the first passage or focuses thereon e.g. using a pointing device pointing to a corresponding location on the display. The first natural language analysis, first search and/or information retrieval of the first search result may then be performed in the background. The first search result may be presented to the reader without a request or instantly when the user enters a corresponding request, e.g. according to a users pre-stored settings.

Thus, access to the digital information may be provided without an active request, a search, an entering of search terms or the like. The processing may conveniently be performed in the background while the user is reading. Thus, no time for waiting is necessary. In other words, supplemental digital information to the text document may be offered to the reader in conjunction with the text passage he is reading without user interaction and without waiting, as a background service of a text reading software or text reading device.

Figure 2:
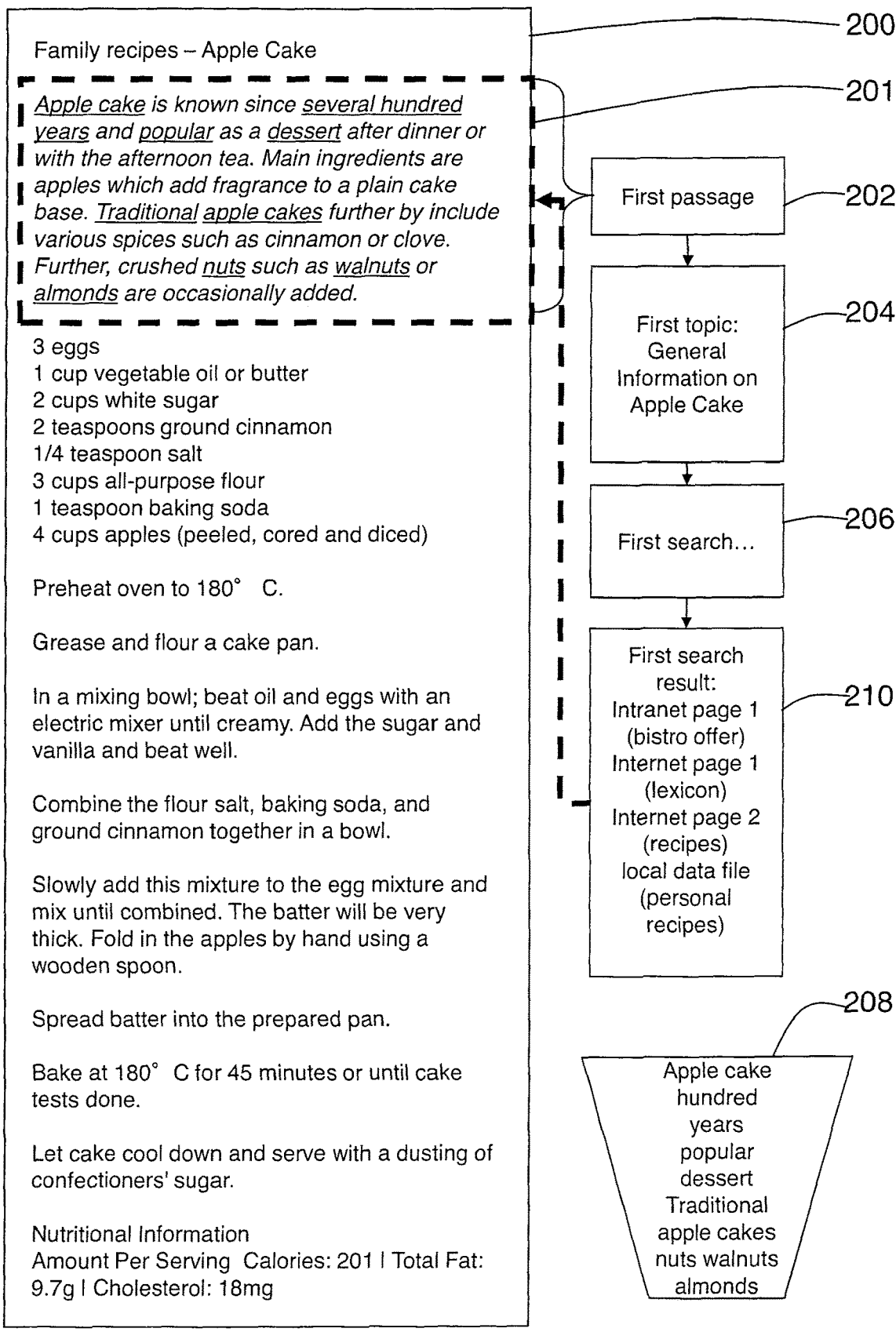
FIG. 2 illustrates steps of the method of FIG. 1 when used in conjunction with a (non-limiting) sample text.

In FIG. 2, an application of the method of FIG. 1 to a sample text is illustrated. As a sample text 200, a recipe for apple cakes is used as a non-limiting example.

An introductory paragraph 201 is identified as the first passage at 202, e.g. by a mouse click of the user, or by the time the user takes for reading, or the displayed text document is automatically divided in the first to x-th passages.

In the first natural language analysis, keywords of introductory paragraph 210 are identified as important in the first passage, e.g. by analyzing their role as subject or object in sentences, by analyzing their relation, by mapping their content to an existing ontology or by determining their frequency of occurrence in introductory paragraph 210 (first passage) with respect to their frequency in the whole text document or in general language documents. These keywords may be marked e.g. by underlining, as shown.

Based on these keywords, general information on apple cake is determined as the first topic at 204.

On this basis, the first search is performed at 206, using search terms 208 as basis for the search, e.g. as a search filter.

At 210, several pieces of digital information are linked to the first passage as the first search result. The linking is illustrated by the dotted arrow to introductory paragraph 210. In the case depicted, the first search result includes a first link to an intranet page providing an offer of a bistro, e.g. an in-house coffee shop. Further, links to an internet page providing a lexicon and to an intranet page including a database comprising recipes are included. Further, a link to a local data file including personal recipes is provided.

Figure 3A:
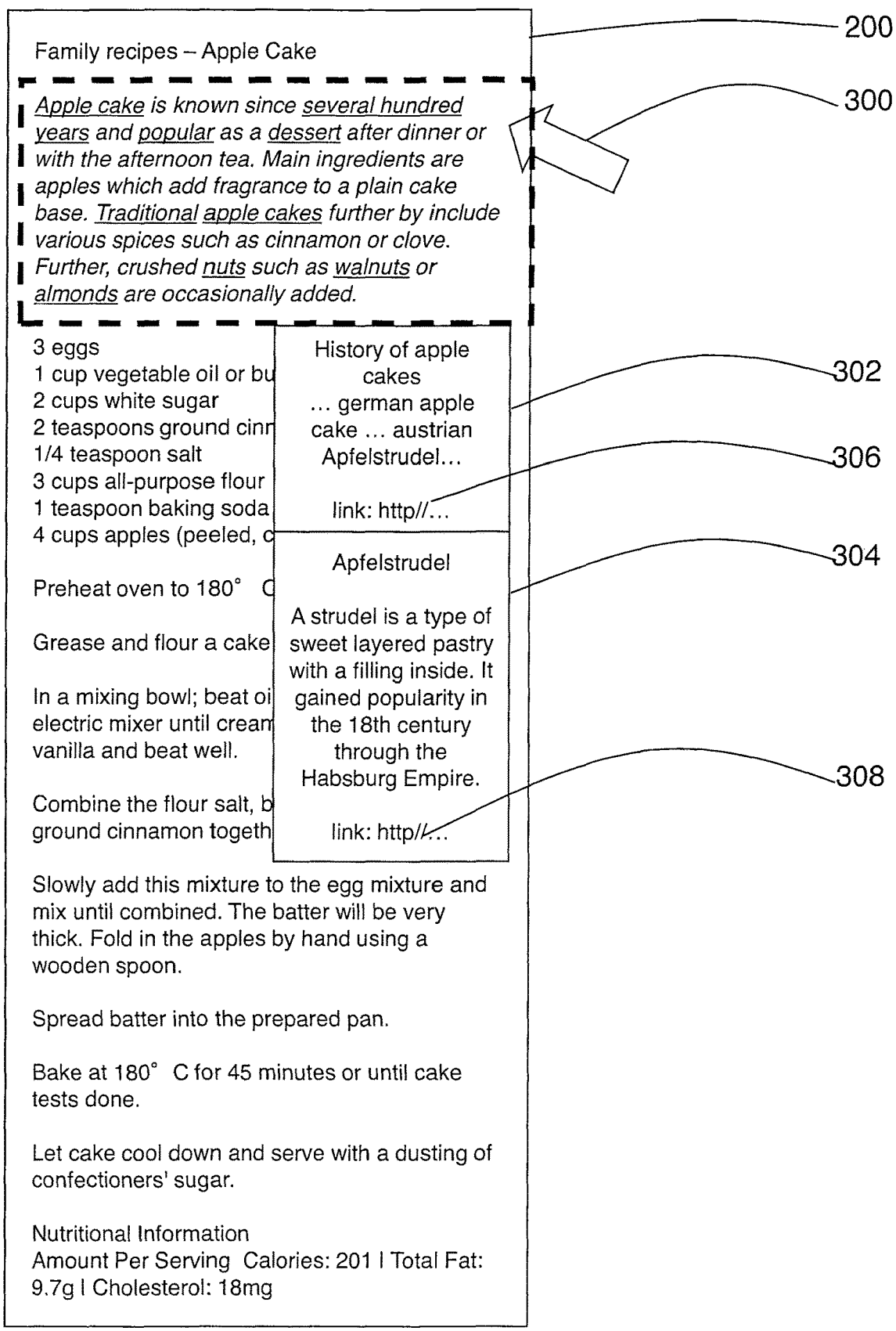
FIG. 3 illustrates effects achieved by the method of FIG. 1 when carried out in conjunction with the sample text.

FIG. 3a illustrates effects achieved by the method of FIG. 1 when carried out in conjunction with the sample text. As shown by arrow 300, the user clicks on the highlighted introductory paragraph 210, for example by using his pointing device. Upon this request, search results 302, 304 are presented to the user by displaying a general topic of the result, related keywords from the result and linking information 306, 308 to the result in an area and/or in a vicinity of introductory paragraph 210, e.g. by overlaying other parts of the text document. Thus, the first search result is presented to the user in conjunction with the first passage upon the request.

FIG. 3b illustrates effects achieved by the method of FIG. 1 in another embodiment of the method, in which the search results 302, 304 and the linking information 306, 308 are presented to the in a separate column, neighboring introductory paragraph 210.

Figure 4:
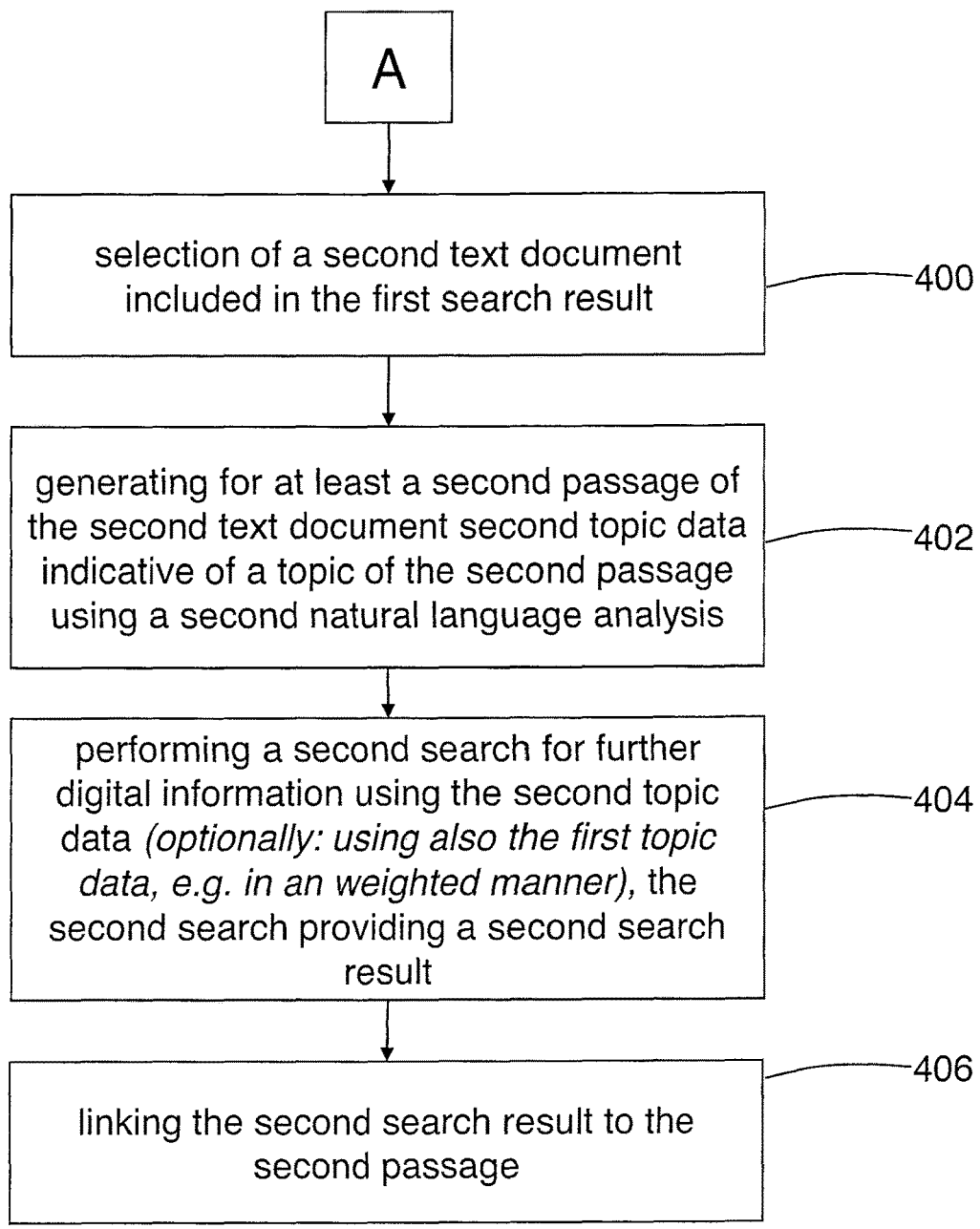
FIG. 4 illustrates further steps that may optionally be performed in conjunction with the method of FIG. 1, yielding an iterated search method.

In FIG. 4, further optional steps to be performed in conjunction with the method of FIG. 1 are illustrated. By these steps, an iterated search method may be obtained.

At block 400, a second text document included in the first search result may be selected. The second text document may be any document included in the first search result, in particular a document or file including text. At block 402, for at least a second passage of the second text document, second topic data indicative of a topic of the second passage is generated using a second natural language analysis. At block 404, a second search for further digital information may be performed using the second topic data, thereby providing a second search result. At block 406, the second search result may be linked to the second passage.

The second text document may be selected by any kind of selection, e.g. by focusing on it or pointing to it using a pointing device or pointing capabilities of a touch screen. The method steps described in blocks 402 to 406 are then carried out with respect to the second text document. These steps may be performed in a corresponding manner as the method steps illustrated in FIG. 1 and as described in the above. Thus, the second passage may be selected from the text document as described for the first passage at 100 in FIG. 1 and in the related description. Further, the second natural language analysis may correspond to or use corresponding techniques as the first natural language analysis carried out at block 100. Still further, the second search using the second topic may be performed using corresponding techniques as during the first search at block 102. Furthermore, the linking of the second search result may correspond to the linking as described for block 104. Certainly, also the optional loading of content corresponding to block 106 may be performed with respect to the second search result. And further, the second passage may also be displayed according to e.g. a second display parameter, and may thus be highlighted as described for block 108. Still further, the second search result linked to the second passage may also be displayed with the second passage e.g. upon a request, corresponding to the displaying described for block 110.

The method steps as illustrated in FIG. 4 allow performing an iterated search, enabling the user to repeatedly move from one document to further documents included in the search result. Thus, the user browses and moves from document to document, retrieved from various sources providing digital information, while being only guided by his interest during reading. No returning to a search bar and no entering of search terms is necessary, since documents of further interest are retrieved and associated (linked) in the background.

This results in a kind of text integrated search engine where the user can surf directly from one text document and/or internet page to another based on search engine results and the local topic and the search/browse history. It combines surfing and searching and enables a new mode of accessing the web. The beginning and end of a corresponding search session is given naturally. While a user is looking for a certain topic the user will move from page to page using the above method. When looking for a different topic, the user may however return to a search engine, e.g. for entering a new search query.

Figure 5:
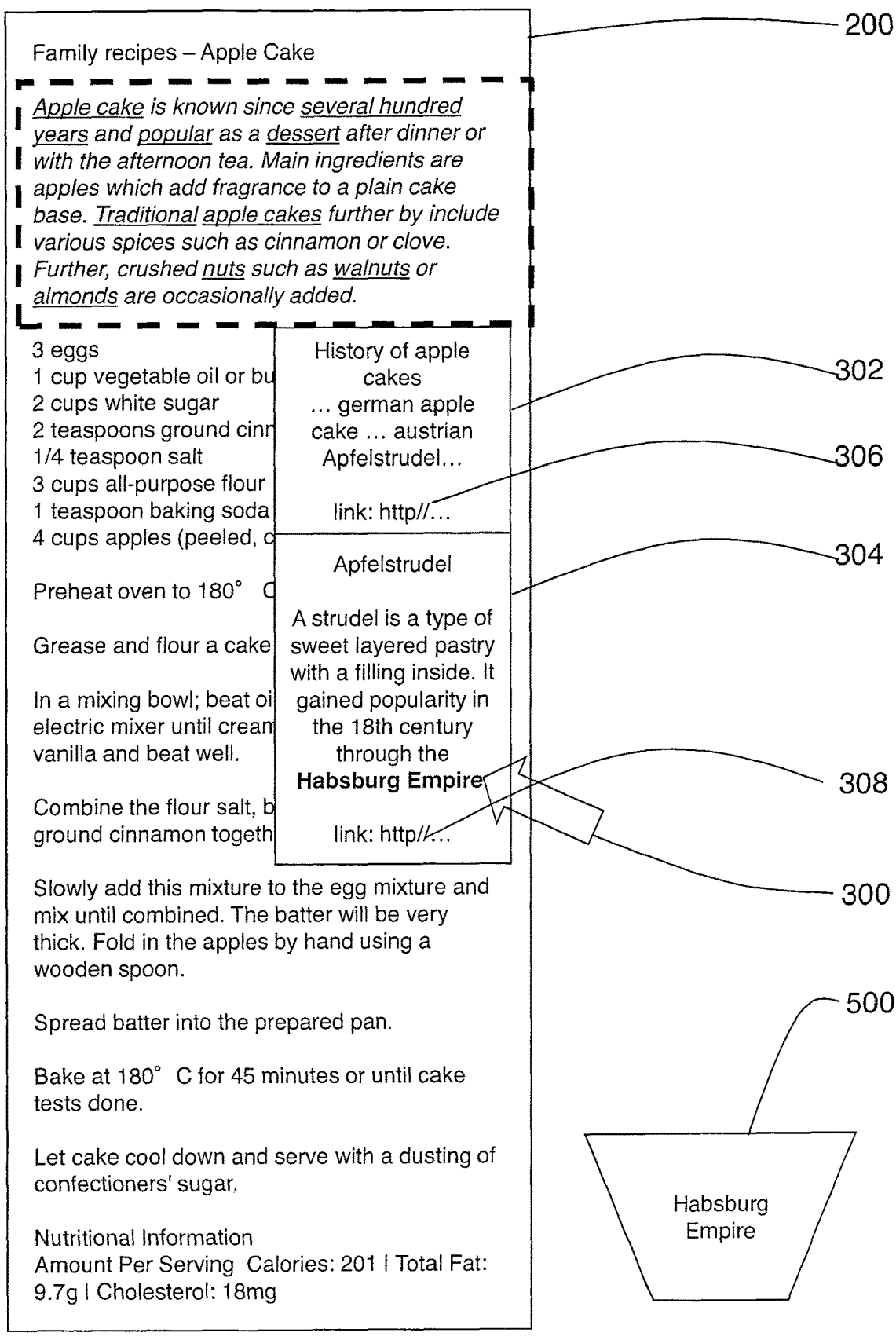
FIG. 5 illustrates effects of the optional further steps illustrated in FIG. 4 when carried out on the example text.

FIG. 5 illustrates the effect of the optional method steps of FIG. 4 for the example illustrated in FIG. 3. In FIG. 5, arrow 300 is supposed to indicate that the user selects the term "Habsburg Empire" as second passage from search result 304. Thus, Habsburg empire is used as the second topic data for example as a further search term 500, and the second search may be carried out on this basis. Thus, the user may initiate a further search without leaving the text document and without entering search terms e.g. to a search bar. Thus, the user may conveniently switch from one document to another, indicating his interest by selecting passages from the document he is reading. The search engine used by the method appears to be built-in to the reader or may even not be noticed by the user, since operating in the background.

Figure 6:
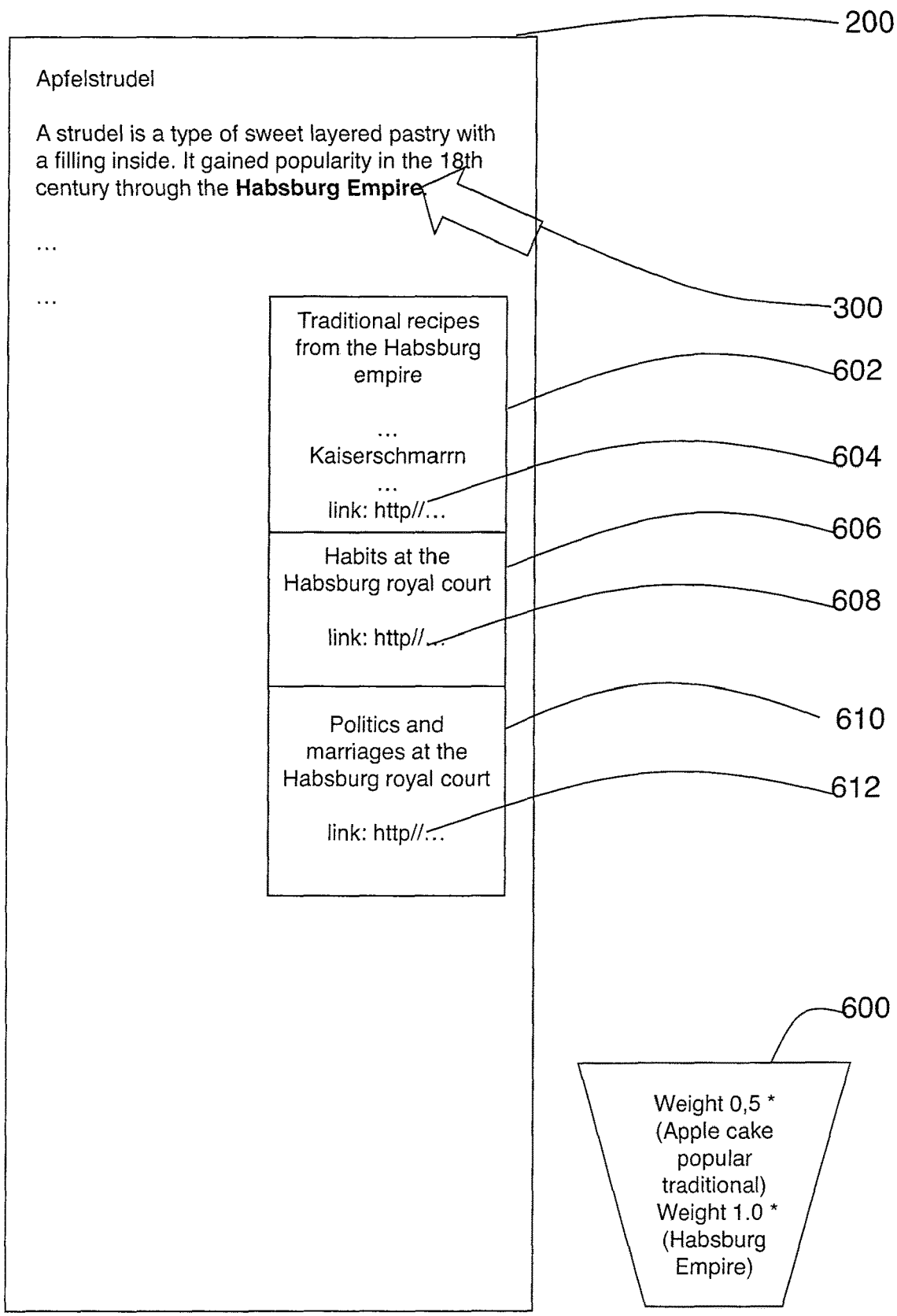
FIG. 6 illustrates effects of the optional further steps illustrated in FIG. 4 in another embodiment of the method.

FIG. 6 illustrates another embodiment, in which the second search result 304 of FIG. 5 has been loaded and is now displayed as a primary text document. It is thus used as the second text document for the second search, e.g. when the method of FIG. 1 or FIG. 4 is applied. In the embodiment, the second search is performed using the first and second topic data.

In other words, both first and second topic data have influence on a search term 600, in which the terms "apple cake", "popular" and "traditional" from the first search illustrated in FIG. 2 are used and weighted with a factor 0.5, while the new search term "Habsburg empire" is added and weighted with a factor 1.0. Thus, the first topic data has an influence on the second search, e.g. as a search parameter of the second search, but has less influence (weight) than the second topic data.

In the embodiment, the search history from a current session is thus used as an additional resource in each search query. The session history is reflected in each of the iterated search steps. This allows a precise search reflecting the user's interests as known from the current session.

In a further embodiment, it is possible that topic data from a predefined number of (or from all) previous searches is used when performing the first search. Thus, in a search query of e.g. the first search, search terms from the previous searches may be included. Thus, the search history from the current session is used in each iterated search step. Likewise, also a search history from previous sessions may also be included.

When using search history data, a proximity weighting may be applied. This allows forgetting about search topics from the past and concentrating on the user's current interest. However, the search results may be expected to be more precise, e.g. adapted to the users interest, than in single step searches using only search terms which are currently entered by the user.

In the example illustrated in FIG. 6, even though only "Habsburg Empire" has been selected as a key word, it is known from the history that the user deals with traditional popular recipes. This is reflected in the search term 600, where the proximity weighting is applied. Thus, a search result 602 dealing with traditional recipes from the Habsburg Empire may ranked on top and before search results 606, 608 and 610, 612 which are not related to the field of recipes.

Figure 7:
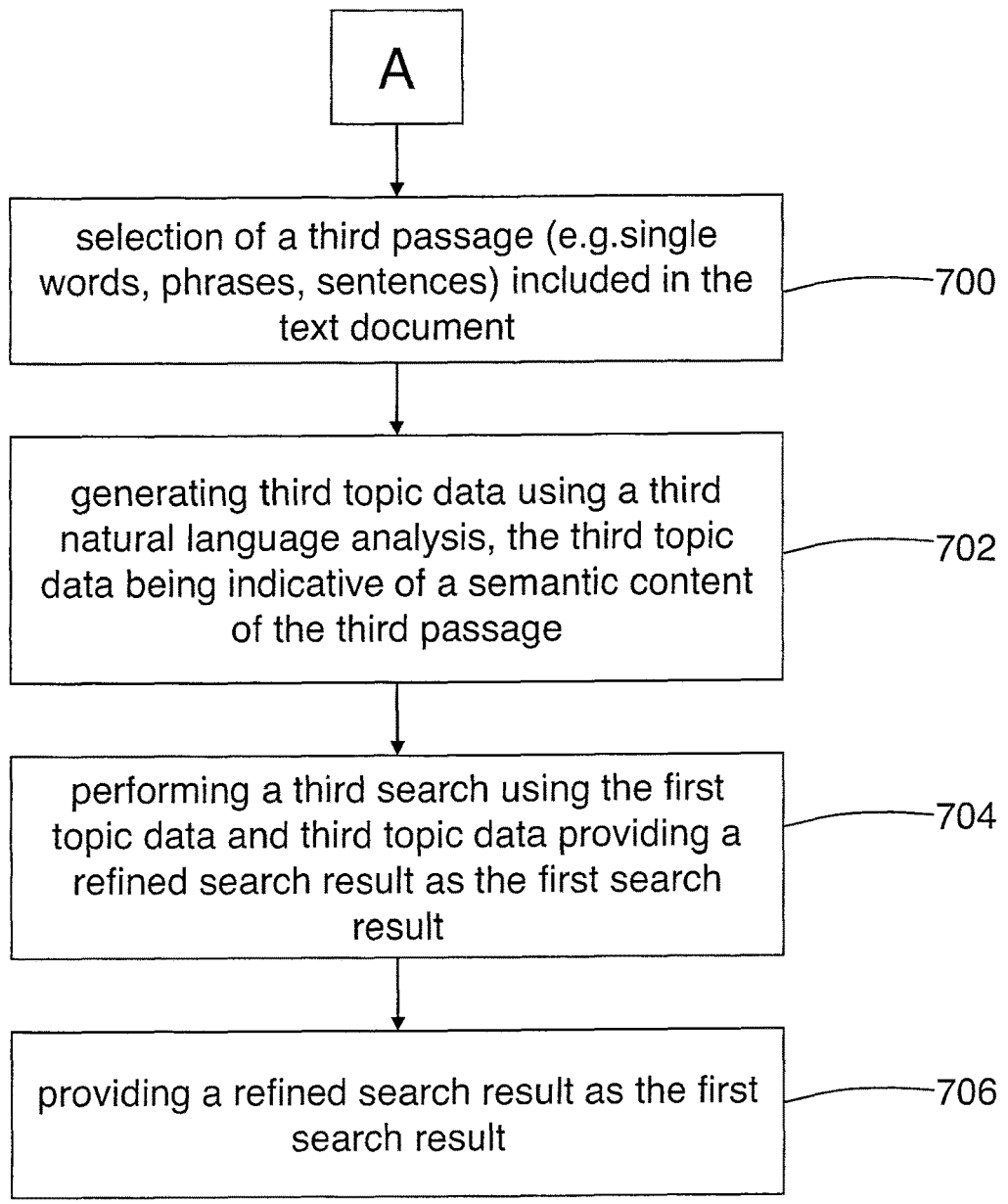
FIG. 7 illustrates further optional method steps that may be performed in conjunction with the method of FIG. 1, yielding a refined search method.

In FIG. 7, further optional steps to be performed in conjunction with the method of FIG. 1 are illustrated. These steps allow a refinement of the search.

At block 700, a third passage may be selected from the text document. As described for the first passage in the above, the third passage may also include single or multiple words, phrases, sentences or paragraphs, located consecutively or non-consecutively. By using a third natural language analysis, third topic data may be generated at block 702, the third topic data being indicative of a semantic content of the third passage. The third natural language analysis may comprise the same methods as the first and second natural language analysis described in the above. At block 704, a third search may be performed using the first topic data and the third topic data. This provides a refined search result, since in addition to the first topic data, the third topic data is used, e.g. by adding corresponding search terms to the search query. The refined search result is then provided as the first search result at block 706.

The additional and optional method steps of FIG. 7 allow refining the search as depicted in FIG. 1, e.g. by adding the third topic data of the third passage. Thus, if a user is not satisfied with a search result, yielding e.g. too many results not meeting his interests, he may refine the search by selecting further passages of the text document.

Effects of these optional method steps are illustrated in the embodiment of FIG. 8, in which arrow 300 illustrates the selection of "ground cinnamon" as the third passage. Upon this selection, a search term 800 is generated including "cinnamon" with weight 1.0, further including the search terms "traditional apple cake" with weight 0.5 and "recipes", "dessert" with weight 0.2 as history-based search terms.

Thus, the first search result may be refined step by step by selection of passages of the text. This enables a convenient navigation towards any digital information of interest, only guided by the user's selected passages and by his reading behavior. It should be noted that again, no manual entering of search terms e.g. to a search bar is necessary. During refinement, also a history-based search and weighting is possible, in which the first topic data may have more or less influence on the third search than the third topic data. For example, a history based proximity weighting of the search terms may be applied.

The search results may be expected to be more precise compared to single step searches with manually entered search queries, since the search is based on the broad context resulting from the selected passages, the whole underlying text and from the session history. Further, the search is convenient since only requiring minimal user interaction and time-saving since most of its parts are carried out in the background.

Figure 9:
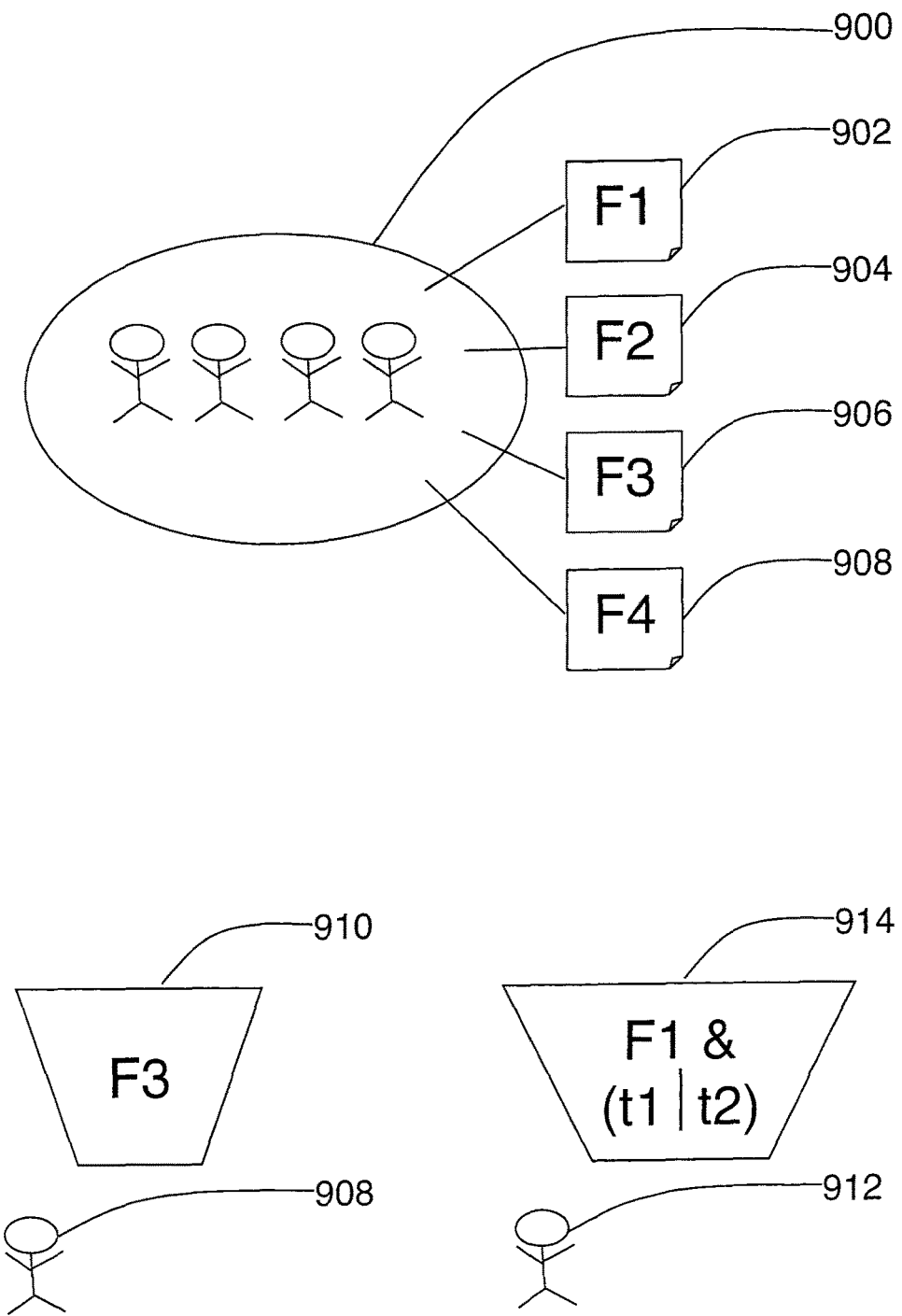
FIG. 9 illustrates collaborative applications of the method of FIG. 1.

In another embodiment of the method illustrated in FIG. 9, the first, second and/or third topic data may be stored e.g. in a log file or as protocol data. This allows the user to move forward and backward through the search history, e.g. for going back and starting a new branch of his search. Further, the log file or log data may be shared with users. For example, search history data of another user may be used when performing the first, second and/or third search. This allows learning search strategies from another user and/or sharing the search history between at least two users.

Corresponding collaborative applications are illustrated in FIG. 9, where from a community 900 of users, several history-based search data log files 902 to 908 are known. Another user 908 intends to learn from the search data provided by the community and uses log file 906 to formulate a search query 910. Still another user 912 uses search data log file 902 for formulating a new query 914, including further search terms in conjunction with e.g. logic operators. Thus, based on the history-based search data, a bunch of session-based applications may be defined.

Figure 10:
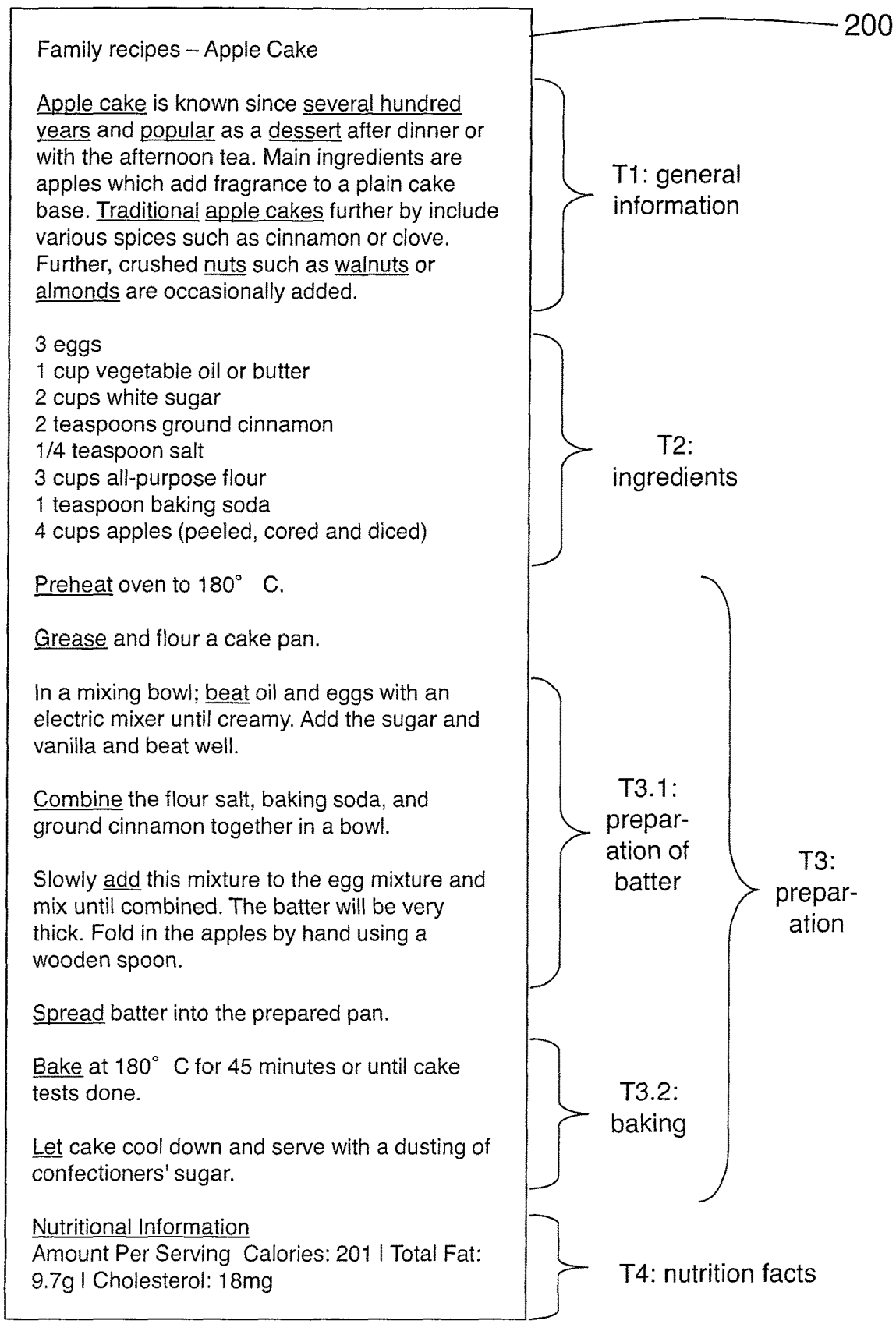
FIG. 10 illustrates a clustering of the sample text based on a natural language analysis.

In a further embodiment illustrated in FIG. 10, passages are determined by clustering phrases, sentences and/or paragraphs of the text document, the phrases, sentences and/or paragraphs having a corresponding semantic content. The clusters may be determined automatically by clustering parts of the text document according to a respective semantic content of the parts. The semantic content of the parts may be determined automatically as described in the above, e.g. using a natural language analysis. Thus, the first passage may be determined automatically by a clustering process clustering parts of the text document with respect to their topic, achieving clusters each having a homogeneous topic.

An automatic clustering of text document 200 is illustrated in FIG. 10. A first cluster T1 includes general information, while a second cluster T2 summarizes the ingredients. Cluster T3 deals with the preparation of the apple cake, and cluster T4 presents the nutrition facts. Cluster T3 includes two sub-clusters T3.1 dealing with the preparation of the batter and T3.2 describing the baking.

Accordingly, the first, second and/or third paragraph may be determined by clustering the text document into segments with similar content. The segments may include multiple document paragraphs, sentences, phrases or words, which need not be located consecutively in the text, but are only defined as belonging to the cluster by their topic. Thus, the clustering may be defined by the related topic and/or semantic content, while the document structure may be without influence to the clustering.

In a further embodiment of the method, the first topic data, the second data and/or the third topic data of a respective passage is determined based on the words identified in the respective passage (cluster) and/or in a neighboring passage (cluster). For determining the respective topic data, at least one of the following is used: a frequency of the words in the respective passage, a frequency of the words in the text document, a term frequency-inverse document frequency of the words in the text document and in a set of further text documents, a mapping of the words to an ontology, a respective weight associated with at least one of the words, the respective weight being determined using a frequency of occurrence of at least one word and/or a distance of the at least one word from the selected item, and a semantic analysis of the words.

For example, for determining the first, second and/or third topic data of a respective passage, all stop words in the passage, i.e. words like "and", "or" or "the" and the like may be ignored. The frequency of the remaining words in the respective passage may be determined. If words occur with a higher frequency, they may be more important for a topic of the passage. Further, words occurring with a high frequency in the respective passage and with a lower frequency in the remaining document may be important for the (local, i.e. first second and/or third) topic of the passage. Such words may be given a higher weight, while words occurring rarely may be given a lower weight. This enables a weighted word-based topic definition. A local topic of a paragraph or section might be refined by differential analysis.

Typically, the "term frequency-inverse document frequency" weight (TF-IDF) may be used for reflecting the importance of a word within the current document with respect to a large global text collection. On this basis, words of importance for topic definition may be identified.

As discussed, words may also be mapped to an ontology, thereby identifying categories of a broader meaning.

A respective weight may be associated with a word based on the distance of the word within the text from a selected item, e.g. a selected text passage marked by the user. A resulting distance-based weighting of word may be useful if no passage is marked, and further if the text is not structured as a sequence of paragraphs.

Further, a semantic analysis of the words reflecting their relations within phrases or sentences, such as their function as subject or object of the sentence, may be performed, thereby identifying the most important words for topic definition.

In a simple embodiment, a list of all words included in the respective passage, but excluding stop words, may be used for topic definition and further for defining the search query. For example, the search query may correspond to the list.

In a further embodiment of the method, the first search result may be displayed in a list upon the request. The list and/or an item of the list may include information representing at least one of a relation between the item and the text document with respect to content, feedback information derived from feedback data regarding the item, the feedback data being previously collected from other users, and a type of content of the item.

For example, the information may be included in the list by displaying items of the list with different colors, fonts or settings. The formatting of the items of the list may depend on a profile or on pre-stored settings of the user.

For example, the information may relate to a relation between the item and the text document with respect to content. For example, it may be visible in the list whether an item relates to more detailed information with respect to the first passage, or whether a corresponding or an alternative opinion is given by the item of the list. Corresponding information may be coded nicely by color or font attributes.

Further, the list may include feedback information. The feedback information may be derived from feedback data regarding the item of the list. The feedback may have been previously collected from other users. For example, a server may note whether users are spending a long time for reading a document, or whether they leave the document quickly. Such feedback may be regarded as implicit feedback. However, the server may also collect explicit feedback provided by the users. If such feedback has been previously collected, it may be reflected in the list. For example, useful items represented in the list may be elevated, while other items may be demoted. Alternatively or in addition, icons or characters reflecting the feedback may be added, such as "+++" for very useful document or "−" for documents of low interest.

Further, the list may be grouped according to a type of content of the items. For example, items relating to lexicon or encyclopedic information may be grouped together, while items relating to content databases, to shopping sites or to social collaboration sites may be grouped separately.

Figure 11:
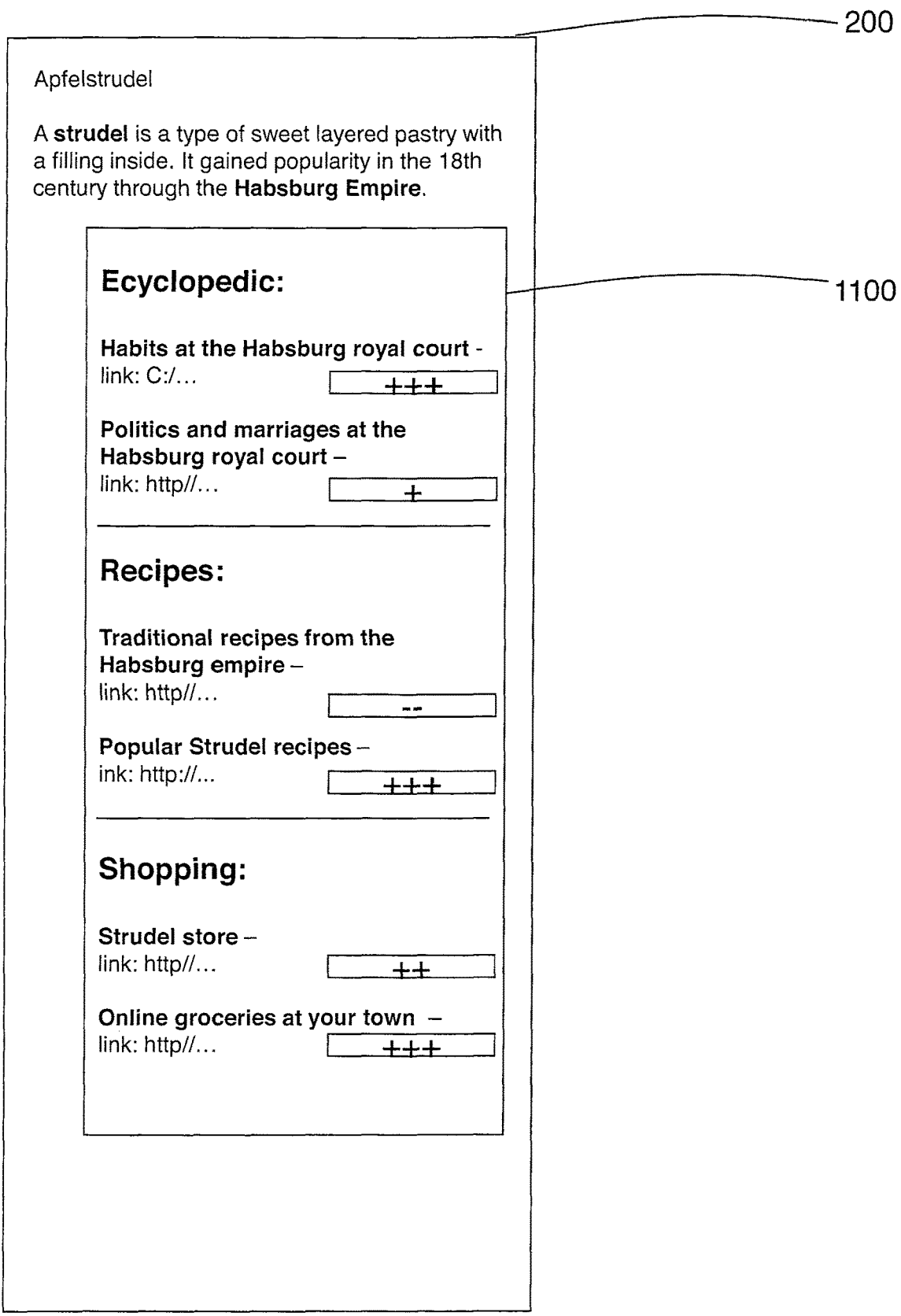
FIG. 11 illustrates an embodiment of the method of FIG. 1 for displaying search results.

FIG. 11 shows a corresponding embodiment, in which a list 1100 is grouped. Encyclopedic items form a first group, recipes form a second group, and shopping sites a third group. Each of the items, i.e. each link, includes ranking information, reflecting feedback given by other users and previously collected by a server device. Thus, additional value is provided to a reading device performing the method. For example, the method may be encoded as a proxy service in manner completely transparent to the user.

Figure 12:
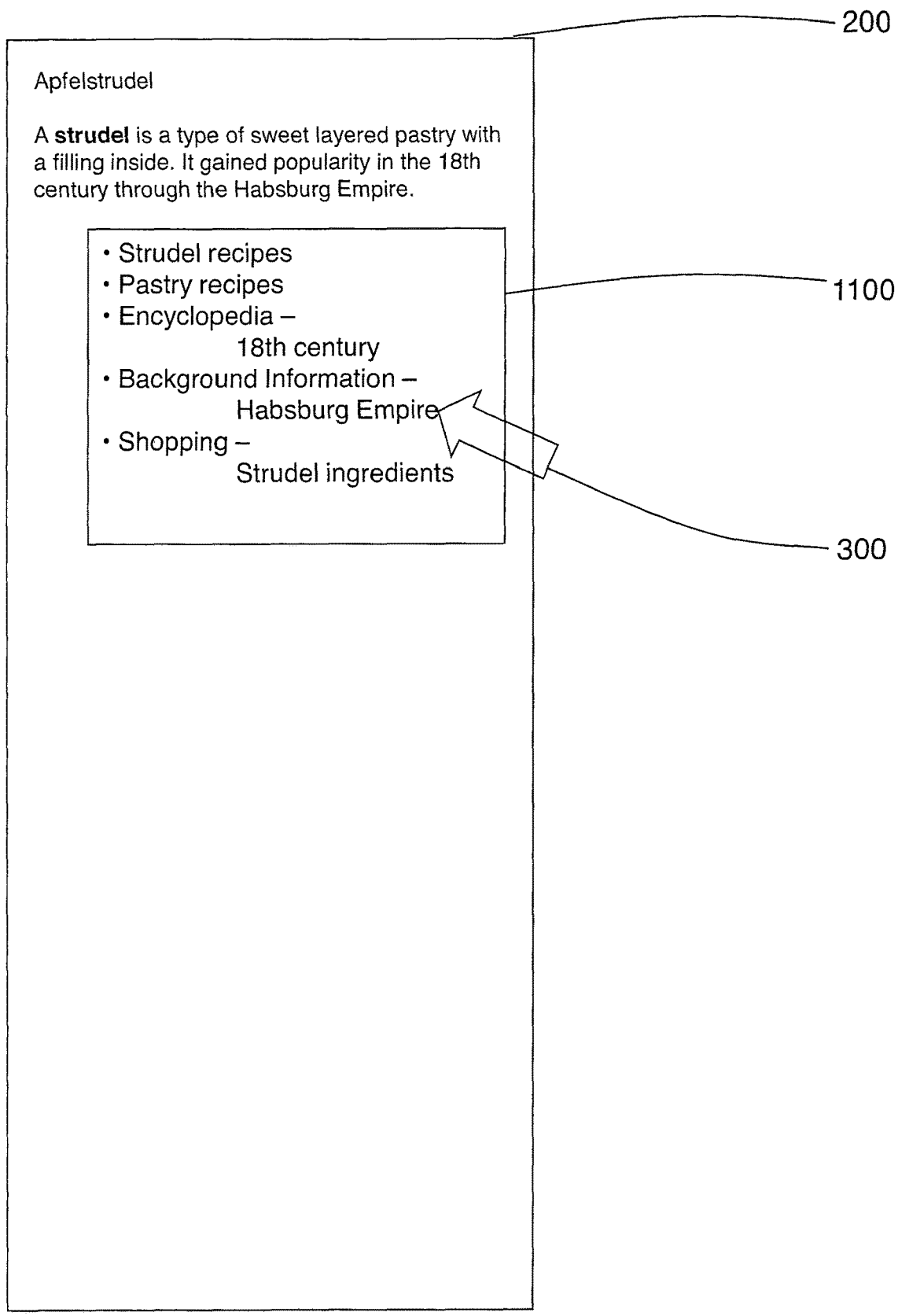
FIG. 12 illustrates a further embodiment in which a keyword-related selection of search results to be displayed is performed.

In a further embodiment illustrated in FIG. 12, a list 1200 of keywords related to the first topic data is displayed upon the request. Upon selection of at least one of the keywords from the list, (only) search results related to at least one of the keywords from the search result are displayed. Thus, list 1200 may include keywords permitting control on the topic to which search results are requested. As illustrated by arrow 300, the user may select the keyword "background information—Habsburg empire" for obtaining only corresponding search results. Thus, the keywords related to the first topic (local keywords) may be used to group the documents related to the first passage, i.e. the documents forming the first search result.

In another embodiment, when a pointing device is moved on the highlighted text, a related list of keywords and keyword combinations may appear to choose from. This gives the user further control on the topic direction, and allows a convenient focusing on search results.

Figure 13:
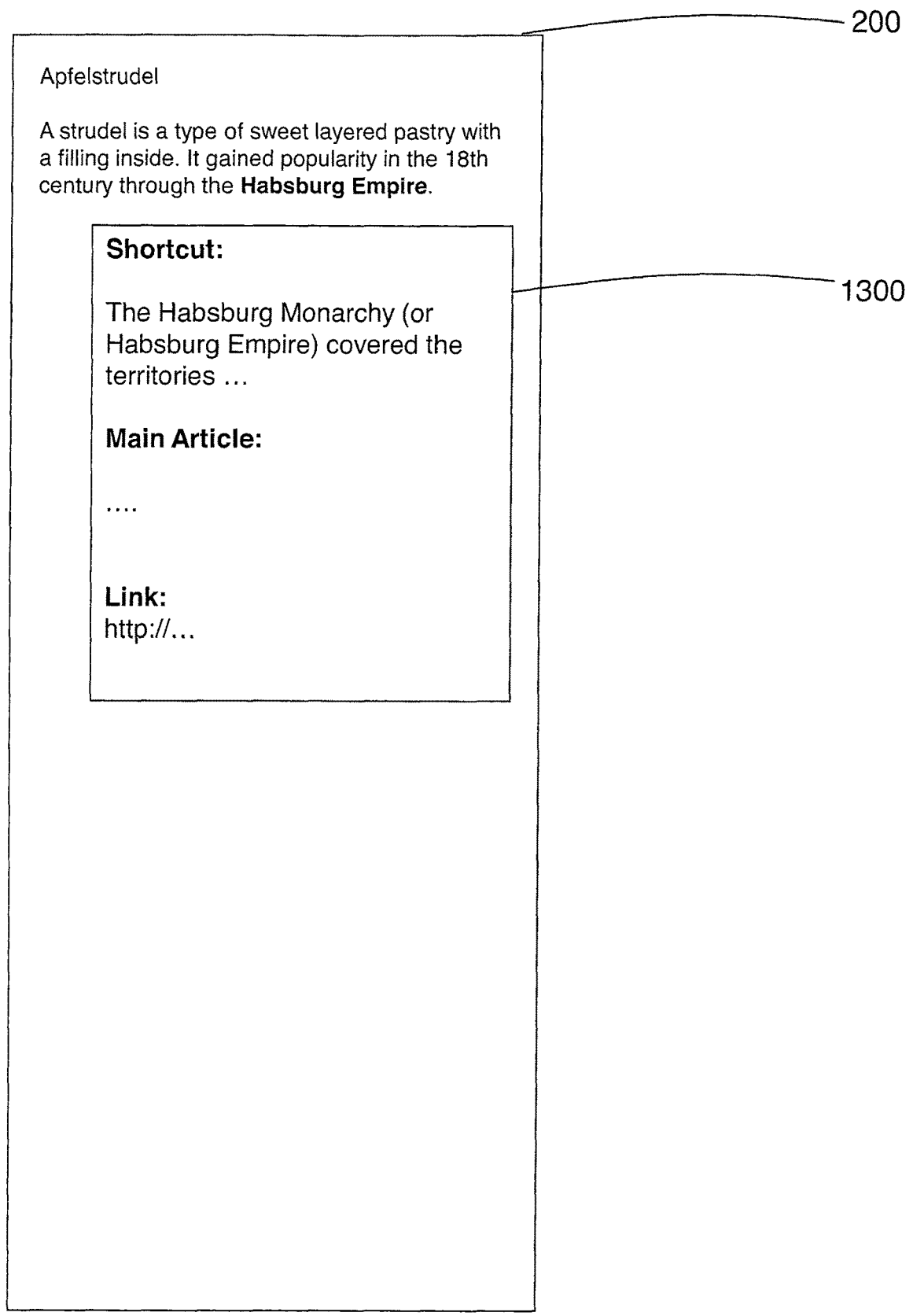
FIG. 13 illustrates an embodiment in which a best matching document of the digital information is displayed together with the text document.

In a still further embodiment illustrated in FIG. 13, a best matching text document from the first search result, a link to the best matching document and/or modified content derived from the best matching text document using the first topic data is displayed upon the request.

For example, if more information related to the Habsburg Empire is required e.g. by keyword selection while reading text document 200, a shortcut of the best matching document 2300 may be provided. In addition, relevant excerpts from a text body of the best matching document may be presented, and a link to the best matching document may be included. Thus, a relevant part of the best matching text document is displayed upon the request and in conjunction with the first passage. The best match is thus shown without leaving the document. Thus, the user may quickly grasp the best matching information.

Figure 14:
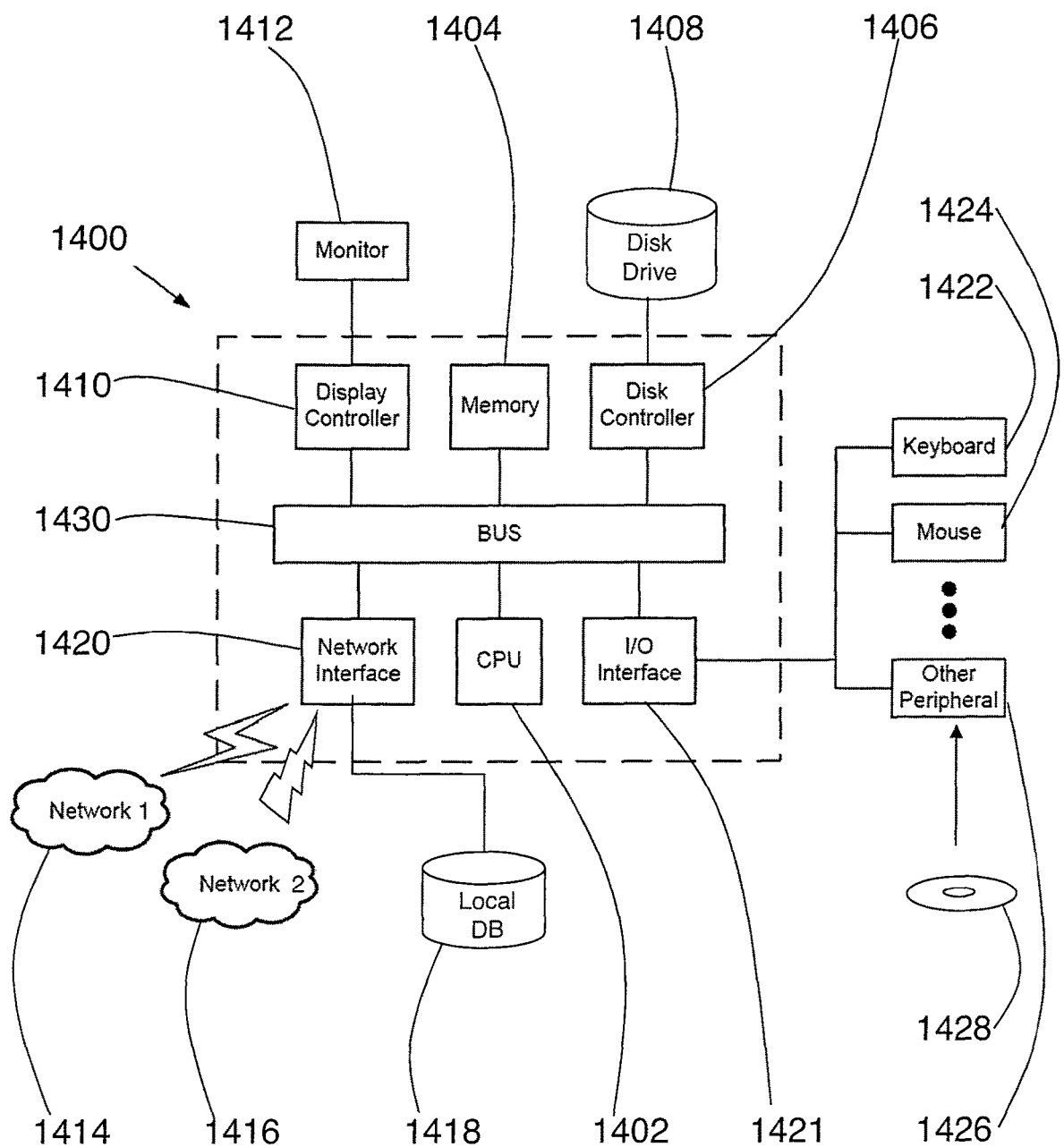
FIG. 14 illustrates an embodiment of a data processing apparatus.

FIG. 14 is a hardware diagram of a processing system embodying aspects of this disclosure, including aspects involving a computer utilized to perform embodiments of the method as described in the above. The computer can communicate with a mobile terminal or device, e.g. for displaying the text document and/or the first, second and third search results.

The processes, algorithms and electronically driven systems described herein can be implemented via a discrete control device or computing system consistent with the structure shown in FIG. 14. Such a system is described herein as a data processing apparatus 1400.

As shown in FIG. 14, a processing system of data processing apparatus 1400 in accordance with this disclosure can be implemented using a microprocessor 1402 or its equivalent, such as a central processing unit (CPU) or at least one application specific processor ASP (not shown). Microprocessor 1402 utilizes a computer readable storage medium 1404, such as a memory (e.g., ROM, EPROM, EEPROM, flash memory, static memory, DRAM, SDRAM, and their equivalents), configured to control microprocessor 1402 to perform and/or control the processes and systems of this disclosure. Other storage mediums can be controlled via a controller, such as a disk controller 1406, which can controls a hard disk drive or optical disk drive 1408.

The microprocessor 1402 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU.

In another aspect, results of processing or the input of data in accordance with this disclosure, in particular the text document and the first, second and third search result, can be displayed via a display controller 1410 to a monitor 1412. The display controller would then preferably include at least one graphic processing unit for improved computational efficiency. Moreover, the monitor 1412 can be provided with a touch-sensitive interface to a command/instruction interface, and other peripherals can be incorporated, including a scanner, a microphone for entering speech commands or a web cam when image-based data entry is used.

The above-noted components can be coupled to several networks, as shown in FIG. 14, such as the Internet 1414, a local intranet 1416, and/or a local network connecting data processing 1400 with storage devices including e.g. a local database 1418 via a network interface 1420 for the transmission and/or reception of data, including controllable parameters. In particular, the text document may be retrieved and loaded from any of the above networks 1414, 1416, 1418 via network interface 1420, or alternatively from disk drive 1408 via disk controller 1406.

Further, the first, second and third search may access digital information on local and remote storages via network interface 1420 through any of the above networks 1414, 1416, 1418.

Further, the network interface 1420 may provide a communication path to the mobile device, e.g. reading device used for reading the text document and displaying the digital information retrieved. The communication path can be provided by way of packets of data. Alternatively, the displaying of the text document and/or of the digital information retrieved may also take place at monitor 1412, i.e. locally at data processing apparatus 1400.

Further, an I/O interface 1421 may be provided, allowing connecting input devices such as keyboard 1422, mouse 1424 and other peripherals 1426, e.g. a reading device for reading a non-transitory storage medium 1428, such as an optical disk, a magnetic disk, semiconductor memory or the like.

The non-transitory storage medium 1428 may include software, e.g. a computer program including computer program instructions, which when executed by data processing apparatus 1400, causes the computer to perform an embodiment of the above described method. The method may comprise generating, for at least the first passage of the text document, the first topic data indicative of the topic of the first passage using the first natural language analysis, performing the first search for the digital information using the first topic data, the first search providing the first search result, linking the first search result to the first passage, and displaying the first search result together with the first passage upon a request, as discussed in the above.

Additionally, a central BUS 1430 may be provided to connect the above hardware components together and to provide at least one path for digital communication therebetween.

Data processing apparatus 1400 may further comprise a data receiver adapted to receive the text document, which data receiver may e.g. include network interface 1420, disk controller 1406 and I/O interface 1421. Further, a natural language analyzer may be included, which is adapted to perform the first natural language analysis on the first passage of the text document and adapted to generate the first topic data indicative of the topic of the first passage. The natural language analyzer may include inter alia microprocessor 1402 and/or specific parts of memory 1404. Further, a data processor, e.g. including microprocessor 1402, may be included, which data processor may be adapted to perform the first search for the digital information using the first topic data, wherein the first search provides the first search result. The data processor may be adapted to link the first search result to the first passage, e.g. by including addresses of memory 1404 indicating where the first search result and/or corresponding metadata may be stored. Further, data processing apparatus 1400 may comprise a display, e.g. included in monitor 1412 and/or in the mobile device, adapted to display the first search result together with the first passage upon a request.

In an alternate embodiment, the data processing apparatus 1400 may comprise a storage, such as memory 1404, adapted to store the first topic data and topic data from a predefined number of previous searches, wherein the data processor is further adapted to perform the first search using a search query including search terms from the first topic data and the topic data from the predefined number of the previous searches. Thus, an iterated search using history-based search data, search terms and/or search queries may be performed, as described for the various embodiments of the method in the above.

Further, the data processing apparatus 1400 may comprise an input device, e.g. keyboard 1422, mouse 1424, the touch-sensitive interface to the command/instruction interface of monitor 1412, and/or the scanner, the microphone or the web cam for image-based data entry. The input device may be adapted to receive the user selection of the second text document included in the first search result. The second text document may be received by the data receiver, analyzed by the natural language analyzer providing second topic data, and processed in a second search using the second topic data and/or the first topic data, e.g. combined in a weighted manner, by the data processor. A result of the second search may then be displayed at the display, e.g. at monitor 1412 or at the mobile device.

Further, the input device may be adapted to receive a user selection of the third passage from the text document. Then, the third passage may be analyzed by the natural language analyzer providing third topic data and processed in a third search using the third topic data and/or the first topic data, e.g. again combined in a weighted manner, by the data processor. A result of the third search may then be displayed at the display.

Further embodiments of the data processing system are a desktop, laptop or tablet computer (system), an e-book reader or a smart phone.

Figure 15:
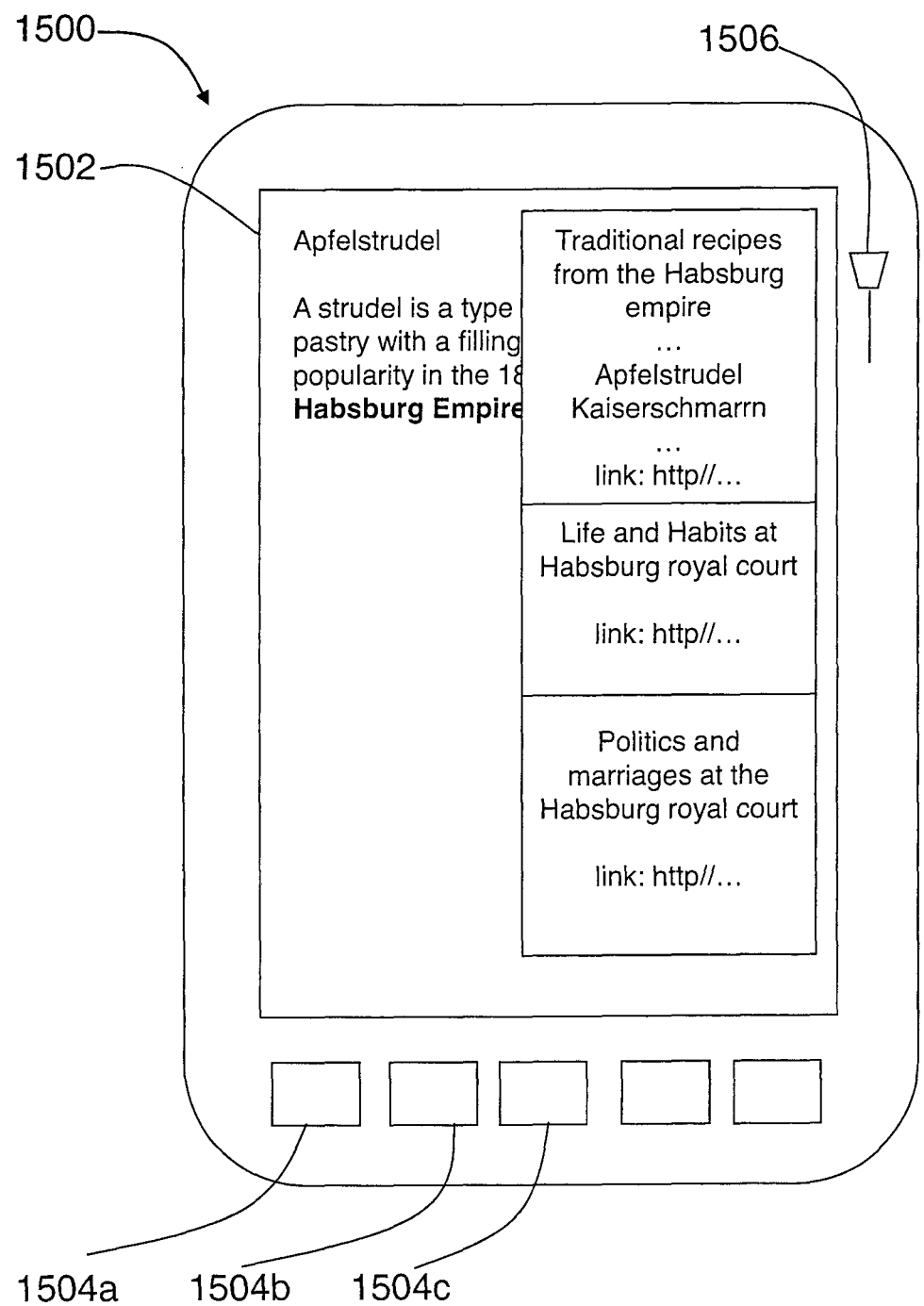
FIG. 15 illustrates a further embodiment of data processing apparatus.

FIG. 15 illustrates as further embodiment of the data processing apparatus a reading device 1500 corresponding to an "e-book reader". Reading device 1500 may be a portable device having a display 1502 at one of its surfaces. The display may be adapted to display the text document and further the first, second and third search result. The display device may further include the touch-sensitive interface as described in the above for entering commands by the user. As a further input capability, keys 1504*a*, 1504*b*, 1504*c*, . . . may be provided. Further, an antenna 1506 may provide access to any kinds of networks, such as e.g. mobile telecommunication or WiFi networks. Antenna 1506 may be included in/connected to a data receiver (not shown) adapted to receive the text document and adapted to provide a communication interface for performing the first, second and third search. Further, the first, second and third search result may be received via antenna 1506 at the data receiver.

At reading device 1500, processing capabilities may be provided, including e.g. the first, second and/or third natural language analyzer and the data processor adapted to perform the first, second third search. However, in alternate embodiments of reading device 1500, any parts of these processing capabilities, e.g. the natural language analyzer and/or the data processor performing the first, second and/or third search, may also reside in an external device accessible e.g. via the above-mentioned networks. In this case, e.g. if at least some of the processing steps are performed by a remote, e.g. stationary device and/or a central server, processing capabilities at reading device 1500 may be kept low. The first, second and/or third search result linked to the first, second or third passage may then be stored locally at the reading device and/or remotely at the server device. In the latter case, storage capabilities of reading device 1500 may be kept low. Further, as illustrated in FIG. 15, small excerpts or shortcuts related to the first, second and third topic data may be stored at reading device 1500 and may e.g. instantly be displayed to a reader, while the rest of the document may be retrieved upon the request.

The above-described devices allow performing a text-integrated search, e.g. a search departing from passages of interest of the text document, which is entirely controlled by the reading interest of the user. When performing the search and departing from the text document, it is not necessary to return to a search bar for entering further search terms. All search terms are drawn from the text document e.g. by the natural language analysis. The search results are expected to be very precise and meeting the users interests, since the search is based on a broad context including the local topic, the whole underlying text of the first text document and/or the session search history.

Obviously, numerous modifications and variations of the present disclosure are possible in light of the above teachings. It is therefore to be understood that within the scope of the appended claims, the invention may be practiced otherwise than as specifically described herein. Further, there is no limitation in combining any of the above mentioned aspects and features in any way.

The invention claimed is:

1. A method for providing digital information based on a text document, the method comprising:
   generating, for at least a first passage of the text document, first topic data indicative of a topic of the first passage using a first natural language analysis;
   performing a first search for the digital information using the first topic data, the first search providing a first search result;
   linking the first search result to the first passage;
   providing, based on the linking, an indication associated with the first passage indicating that the first search results are available;
   displaying the indication associated with the first passage before display of the first search result;
   displaying, upon receipt of a request after display of the indication, the first search result as an overlay on the text document, wherein the overlay of the first search result includes modified content of documents identified by the first search result;
   generating, using a second natural language analysis, second topic data from a second text document selected from the first search result;
   performing a second search using the second topic data, the first topic data and a search history of previous searches by a user, the second search providing a second search result, wherein the second topic data is weighted greater than the first topic data such that the second topic data has a greater influence on the second search result; and
   linking the second search result to a second passage.

2. The method of claim 1, further comprising loading a content of the first search result.

3. The method of claim 1, further comprising:
   displaying the first passage according to a display parameter, wherein
   the display parameter is determined according to at least one of the first topic data, the first search result and a semantic content of the first search result.

4. The method of claim 1, wherein the first search result is displayed adjacent to the first passage.

5. The method of claim 1, wherein the first topic data has less influence on the second search than the second topic data.

6. The method of claim 1, wherein
   topic data from a predefined number of previous searches is used in performance of the first search, and
   in a search query of the first search, search terms from the previous searches are included.

7. The method of claim 1, wherein
   upon a selection of a third passage included in the text document, a third search is performed using the first topic data and third topic data, the third search providing a refined search result as the first search result, and
   the third topic data is generated using a third natural language analysis and is indicative of a semantic content of the third passage.

8. The method of claim 7, wherein the first topic data has more or less influence on the third search than the third topic data.

9. The method of claim 7, wherein the first topic data, the second topic data and/or the third topic data of a respective passage is determined based on words identified in the respective passage and/or in a neighboring passage, using at least one of:
   a frequency of the words in the respective passage;
   a frequency of the words in the text document;
   a term frequency—inverse document frequency of the words in the text document and in a set of further text documents;
   a mapping of the words to an ontology;
   a respective weight associated with at least one of the words, the respective weight being determined using a frequency of occurrence of the at least one word and/or a distance of the at least one word from a selected item; and
   a semantic analysis of the words.

10. The method of claim 1, wherein said performing said second search uses search history data of another user.

11. The method of claim 1, wherein
   the first passage includes a plurality of phrases, sentences and/or paragraphs of the text document, the phrases, sentences and/or paragraphs having a corresponding semantic content, and the plurality of phrases, sentences and/or paragraphs are determined by clustering parts of the text document according to a respective semantic content of the parts.

12. The method of claim 1, wherein upon the request, the first search result is displayed in a list, and the list and/or an item of the list includes information representing at least one of:
  a relation between the item and the text document with respect to content;
  feedback information derived from feedback data regarding the item of the list, the feedback data being previously collected from other users; and
  a type of content of the item.

13. The method of claim 1, wherein upon the request, a list of keywords related to the first topic data is displayed, and upon selection of at least one of the keywords from the list, search results related to the at least one of the keywords from the first search result are displayed.

14. The method of claim 1, wherein upon the request, a best matching text document from the first search result, a link to the best matching document and/or modified content derived from the best matching text document using the first topic data is displayed.

15. The method of claim 1, wherein upon a retrieval of the text document, an initial natural language analysis of the text document is performed in a background process, providing a set of passages of the text document, wherein each of the passages of the set is associated with at least one topic, for each of the passages of the set, the first search is carried out using the associated at least one topic, and for each of the passages of the set, the respective first search result is displayed.

16. The method of claim 1, wherein the second topic data is weighted at least double the first topic data.

17. A data processing apparatus, comprising:
  circuitry configured to
    receive a text document;
    perform a first natural language analysis on a first passage of the text document and to generate first topic data indicative of a topic of the first passage;
    perform a first search for the digital information using the first topic data, the first search providing a first search result, and link the first search result to the first passage;
    provide, based on the linking, an indication associated with the first passage indicating that the first search results are available;
    display the indication associated with the first passage before display of the first search result;
    display, upon receipt of a request after display of the indication, the first search result as an overlay on the text document, wherein the overlay of the first search result includes modified content of documents identified by the first search result; and
    generate, using a second natural language analysis, second topic data from a second text document selected from the first search result;
    perform a second search using the second topic data, the first topic data and a search history of previous searches by a user, the second search providing a second search result, wherein the second topic data is weighted greater than the first topic data such that the second topic data has a greater influence on the second search result; and
    link the second search result to a second passage.

18. The data processing apparatus according to claim 17, wherein the circuitry is further configured to:
  store the first topic data and topic data from a predefined number of previous searches; and
  perform the first search using a search query including search terms from the first topic data and the topic data from the predefined number of the previous searches.

19. The data processing apparatus according to claim 17, wherein the circuitry is further configured to receive a user selection of a third passage from the text document, and the third passage is analyzed to provide third topic data, processed in a third search using the third topic data and/or the first topic data, and a result of the third search is displayed.

20. A non-transitory computer-readable medium encoded with computer-readable instructions that, when executed by a processor, cause the processor to perform a method comprising:
  generating, for at least a first passage of the text document, first topic data indicative of a topic of the first passage using a first natural language analysis;
  performing a first search for the digital information using the first topic data, the first search providing a first search result;
  linking the first search result to the first passage;
  providing, based on the linking, an indication associated with the first passage indicating that the first search results are available;
  displaying the indication associated with the first passage before display of the first search result;
  displaying, upon receipt of a request after display of the indication, the first search result as an overlay on the text document, wherein the overlay of the first search result includes modified content of documents identified by the first search result; and
  generating, using a second natural language analysis, second topic data from a second text document selected from the first search result;
  performing a second search using the second topic data, the first topic data and a search history of previous searches by a user, the second search providing a second search result, wherein the second topic data is weighted greater than the first topic data such that the second topic data has a greater influence on the second search result; and
  linking the second search result to a second passage.

* * * * *